United States Patent
Huber et al.

(10) Patent No.: US 9,156,466 B2
(45) Date of Patent: Oct. 13, 2015

(54) METHOD AND APPARATUS FOR POWER MANAGEMENT OF AN ELECTRIC DRIVE FOR A HYBRID VEHICLE

(71) Applicant: Robert Bosch GmbH, Stuttgart (DE)

(72) Inventors: Thomas Huber, Daisbach (DE); Jochen Fassnacht, Calw (DE); Michael Lehner, Wiernsheim (DE); Cornelius Liebenow, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/364,459

(22) PCT Filed: Nov. 15, 2012

(86) PCT No.: PCT/EP2012/072675
§ 371 (c)(1),
(2) Date: Jun. 11, 2014

(87) PCT Pub. No.: WO2013/092020
PCT Pub. Date: Jun. 27, 2013

(65) Prior Publication Data
US 2014/0336861 A1    Nov. 13, 2014

(30) Foreign Application Priority Data
Dec. 19, 2011 (DE) .................. 10 2011 089 085

(51) Int. Cl.
*G05D 1/00* (2006.01)
*B60K 6/448* (2007.10)
(Continued)

(52) U.S. Cl.
CPC ............ *B60W 20/00* (2013.01); *B60L 15/2045* (2013.01); *B60R 16/03* (2013.01);
(Continued)

(58) Field of Classification Search
CPC ...... G01N 30/6043; H02M 1/12; H02M 1/44; H02M 2005/2935; H02M 3/157; A61B 2017/00398; G01R 21/06; G01R 23/02; G01R 19/04; G01R 19/30; G01R 27/22; G01R 31/021; H01H 47/005; H01H 35/00

USPC .............. 701/22, 83, 84, 70, 490; 903/930; 180/65.1–65.8; 340/995.1, 995.19
See application file for complete search history.

(56) References Cited

U.S. PATENT DOCUMENTS

| 6,879,895 B2 | 4/2005 | Capps et al. |
| 7,076,350 B2 | 7/2006 | Alvarez-Troncoso et al. |

(Continued)

FOREIGN PATENT DOCUMENTS

| DE | 102008001669 | 11/2009 |
| DE | 102010048353 | 6/2011 |

OTHER PUBLICATIONS

International Search Report for Application No. PCT/EP2012/072675 dated Feb. 6, 2013 (English Translation, 2 pages).

*Primary Examiner* — Muhammad Shafi
(74) *Attorney, Agent, or Firm* — Michael Best & Friedrich LLP

(57) ABSTRACT

The invention relates to a method and a device for power management of an electrical drive for a hybrid vehicle, wherein the method comprises the following steps: detecting (S1) an adjustable power requirement for the electrical drive device and an available electrical battery capacity of the electrical energy store by means of a detecting unit (21); comparing (S2) the detected adjustable power requirement to the detected available electrical battery capacity by means of a control unit (22); and deactivating (S3) at least one of the electrical consumers in dependence on criteria specified by the control unit for one or a plurality of specified time intervals by the control unit (22), if the comparison results in a lower available electrical battery capacity than the adjustable power requirement.

13 Claims, 3 Drawing Sheets

(51) Int. Cl.
  *B60W 20/00* (2006.01)
  *B60R 16/03* (2006.01)
  *B60W 10/08* (2006.01)
  *B60W 10/30* (2006.01)
  *B60L 15/20* (2006.01)
  *H02J 1/14* (2006.01)
  *B60W 10/26* (2006.01)
  *B60W 50/08* (2012.01)
  *B60L 1/00* (2006.01)
  *B60W 50/00* (2006.01)

(52) U.S. Cl.
  CPC .............. *B60W 10/08* (2013.01); *B60W 10/26* (2013.01); *B60W 10/30* (2013.01); *H02J 1/14* (2013.01); *B60L 1/00* (2013.01); *B60W 20/106* (2013.01); *B60W 50/082* (2013.01); *B60W 2050/009* (2013.01); *B60W 2510/244* (2013.01); *B60W 2710/086* (2013.01); *B60W 2710/305* (2013.01); *B60W 2720/30* (2013.01); *Y02T 10/7283* (2013.01); *Y10S 903/93* (2013.01)

(56) References Cited

U.S. PATENT DOCUMENTS

| | | | |
|---|---|---|---|
| 2003/0052649 A1* | 3/2003 | Landgraf et al. | 320/135 |
| 2009/0131215 A1 | 5/2009 | Shamoto | |
| 2011/0089758 A1* | 4/2011 | Kinser et al. | 307/10.1 |

* cited by examiner

METHOD AND APPARATUS FOR POWER MANAGEMENT OF AN ELECTRIC DRIVE FOR A HYBRID VEHICLE

BACKGROUND OF THE INVENTION

The invention relates to a method and an apparatus for power management of an electric drive for a hybrid vehicle.

US 2005 0137764 A1 describes an energy management system for controlling an electrical system. The energy management system comprises data detection components, such as sensors, for example, for providing quantified variables for forming an instantaneous state vector. A time series predictor generates an estimated future vector value in response to the instantaneous state vector. An electrical system manager comprises predetermined decision rules which are called up in response to the estimated future vector value in order to match the electrical system to expected electrical conditions.

The energy management system described therein further comprises an independent energy manager unit in the form of a microcontroller and a driver/switching module. The independent energy manager unit in this case controls power inputs of a multiplicity of energy sources, including an electrochemical battery and an electric generator.

US 2003 0200017 A1 describes an apparatus in a motor vehicle for prioritizing and start-sequencing super capacitors and ultra capacitors, when the current source and the electrical consumers are used indirectly coupled in the vehicle electrical distribution system in the motor vehicle. The apparatus furthermore comprises a circuit breaker, a CAN bus (Controller Area Network Bus) and further interfaces with energy or current sources provided in the motor vehicle. In addition, the apparatus described therein uses load shedding and temperature compensation, which are implemented in control electronics.

SUMMARY OF THE INVENTION

The present invention provides a method for power management of an electric drive for a hybrid vehicle. In this case, the method comprises the following steps: detecting a power demand that can be set for the electric drive device and an available electric battery power of the electrical energy store by means of a detection unit; comparing the detected power demand that can be set with the detected available electric battery power by means of a control unit; and disconnecting at least one of the electrical consumers depending on criteria predetermined by the control unit for one or more fixed time intervals by means of the control unit when the comparison result indicates a lower available electric battery power than the power demand that can be set.

The invention is based on the basic concept that, in a hybrid electric motor vehicle, during operation of the vehicle the power flow between power sources and electrical consumers needs to be controlled and coordinated. If the sum of the power demands of the electrical consumers is greater than the available power from the electrical power sources, the electrical consumers need to be prioritized and the electrical power which is made available for specific electrical consumers needs to be restricted.

If the driver demands the maximum driving power from the hybrid vehicle and at the same time further electrical consumers such as, for example, interior electrical air conditioning, an electric battery heater, an internal electric heater or an electrical DC-to-DC converter are active, the control unit, after evaluation or prioritization of the electrical consumers, needs to temporarily restrict the power to the further consumers in order that the full power can be used for the electric driving.

The method according to the invention has the further advantage of achieving a cost-efficient design of the electrical energy store without needing to accept substantial restrictions to the system performance of the electric drive train of the hybrid vehicle.

In accordance with a first embodiment of the invention, the power demand that can be set for the electric drive device is determined by a driving mode selected by the driver. This has the advantage that, as a result, the driver can have an influence directly on the electric driving power in a simple manner.

In accordance with a further embodiment of the invention, the power demand that can be set for the electric drive device is determined by the control unit on the basis of the vehicle parameters or driving parameters. This enables convenient use of the method for increasing power.

In accordance with a further embodiment of the invention, the available electric battery power of the electrical energy store is detected by electric power sensors of the detection unit.

In accordance with a further embodiment of the invention, during the comparison of the detected power demand that can be set with the detected available electric battery power, a difference sum is determined by the control unit, and the determined difference sum is used as one of the predetermined criteria for disconnection of a specific electrical consumer by the control unit. The value of the difference sum can in this case determine which of the electrical consumers is disconnected or whether a plurality of electrical consumers are disconnected simultaneously. Thus, an efficient mode of operation of the hybrid vehicle is provided.

In accordance with a further embodiment of the invention, an interior air-conditioning unit, a battery air-conditioning unit, a DC-to-DC converter unit or an interior heating unit is used as electrical consumer.

In accordance with a further embodiment of the invention, a time interval with a duration of up to 120 seconds, preferably of up to 60 seconds and particularly preferably of up to 30 seconds is used as one of the fixed time intervals. This enables an assignment of different disconnection intervals to the respective electrical consumers, with this assignment being matched to the requirements of the electrical consumers.

In accordance with a further embodiment of the invention, after disconnection of an electrical consumer, for a fixed time interval electrical power is made available to the electrical consumer again once the fixed time interval for a fixed switch-on time interval has elapsed. This advantageously enables safe operation of the electrical consumers and permanent disconnections of individual electrical consumers which may impair driving comfort are avoided.

In accordance with a further embodiment of the invention, the disconnection of an electrical consumer is performed by a continuous reduction in the electrical power made available to the electrical consumer. This embodiment has the advantage that the electrical consumers and the vehicle electrical distribution system of the hybrid vehicle are protected since peak currents and peak voltages which are damaging for the system components are avoided.

The invention also provides an apparatus for power management of an electric drive device of a hybrid vehicle comprising electrical consumers and an electrical energy store, wherein the apparatus comprises a detection unit and a control unit, wherein the detection unit is configured so as to detect a power demand that can be set for the electric drive device and an available electric battery power of the electrical energy store, wherein the control unit is configured so as to compare the detected power demand that can be set with the detected available electric battery power and to disconnect at least one of the electrical consumers depending on criteria predetermined by the control unit for one or more fixed time intervals, which time intervals are fixed in each case for the respective electrical consumer by the control unit, when the comparison result indicates a lower available electric battery power than the power demand that can be set.

The control unit and the detection unit can in this case also be implemented by a single unit, for example in the form of a microcontroller or another single-chip computer system.

BRIEF DESCRIPTION OF THE FIGURES

Further features and advantages of embodiments of the invention result from the description below relating to the attached figures.

DETAILED DESCRIPTION

Figure 1:
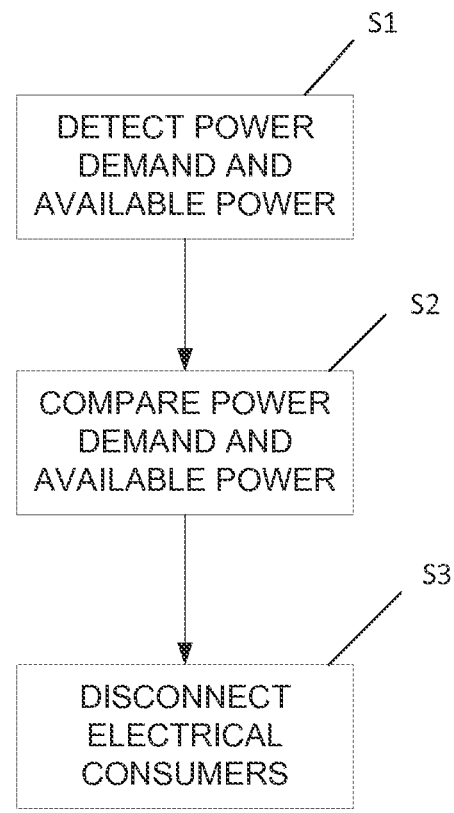
FIG. 1 shows a schematic flowchart of a method for the power management of an electric drive device of a hybrid vehicle in accordance with a possible embodiment of the invention.

Identical and functionally identical elements, features and components (where not stated otherwise) have each been provided with the same references in the figures of the drawing. In addition, it goes without saying that components and elements in the drawings are not necessarily reproduced true to scale with respect to one another for reasons of clarity and understandability.

The method and the apparatus for power management of an electric drive device of a hybrid vehicle can be used for a hybrid electric motor vehicle, a plug-in hybrid, a microhybrid, a mild hybrid or a full hybrid. A plug-in hybrid, also referred to as a plug-in hybrid electric vehicle or PHEV, is a motor vehicle with a hybrid drive, whose electrical energy store can be charged externally additionally via an electrical grid which can be connected to the hybrid vehicle.

FIG. 1 shows a schematic flowchart of a method for power management of an electric drive device of a hybrid vehicle in accordance with a possible embodiment of the invention.

In a first step of the method, detecting S1 of a power demand that can be set for the electric drive device and an available electric battery power of the electrical energy store is performed by a detection unit 21.

Then, in a second step of the method, a comparison S2 of the detected power demand that can be set with the detected available electric battery power is performed by a control unit 22.

In a third step, a disconnection S3 of at least one of the electrical consumers depending on criteria predetermined by the control unit 22 for one or more fixed time intervals is performed by the control unit 22 if the comparison result indicates a lower available electric battery power than the power demand that can be set.

The individual method steps can in this case be implemented in any desired sequence. A repetition of the individual method steps in any conceivable type of loop or as a recursive function in any desired manner using a multiplicity of discontinuation conditions is also conceivable.

Demands for an effective switch-on duration of the respective electrical consumer can be used as predetermined criteria, for example. By way of example, a DC-to-DC converter can be disconnected up to 25%, while the interior air-conditioning device can be disconnected up to 75% during travel.

For example, without the method for increasing the power of an electric drive device, in the case of a plug-in hybrid, 65 kW are generated as the maximum mechanical power for driving using the electric drive device, wherein 7 kW of power losses occur. However, in total 90.6 kW of electric battery power need to be made available by the electrical energy store since 1.6 kW are used for the vehicle electrical distribution system power, 7 kW for the electrical air conditioning and 10 kW for the interior electric heater.

By virtue of the use of the method for increasing the power of an electric drive device in the same plug-in hybrid, given the same generation of 65 kW of mechanical drive power, in turn 7 kW of power losses occur. However, the battery power to be applied when using the method given complete disconnection of all of the electrical consumers is only 72 kW. In this case, the vehicle electrical distribution system, the electrical air conditioning and the interior electric heater are disconnected. Here, the functional restrictions owing to the disconnection of the electrical consumers are barely noticeable owing to the limited time interval during which the electrical consumers are disconnected.

Figure 2:
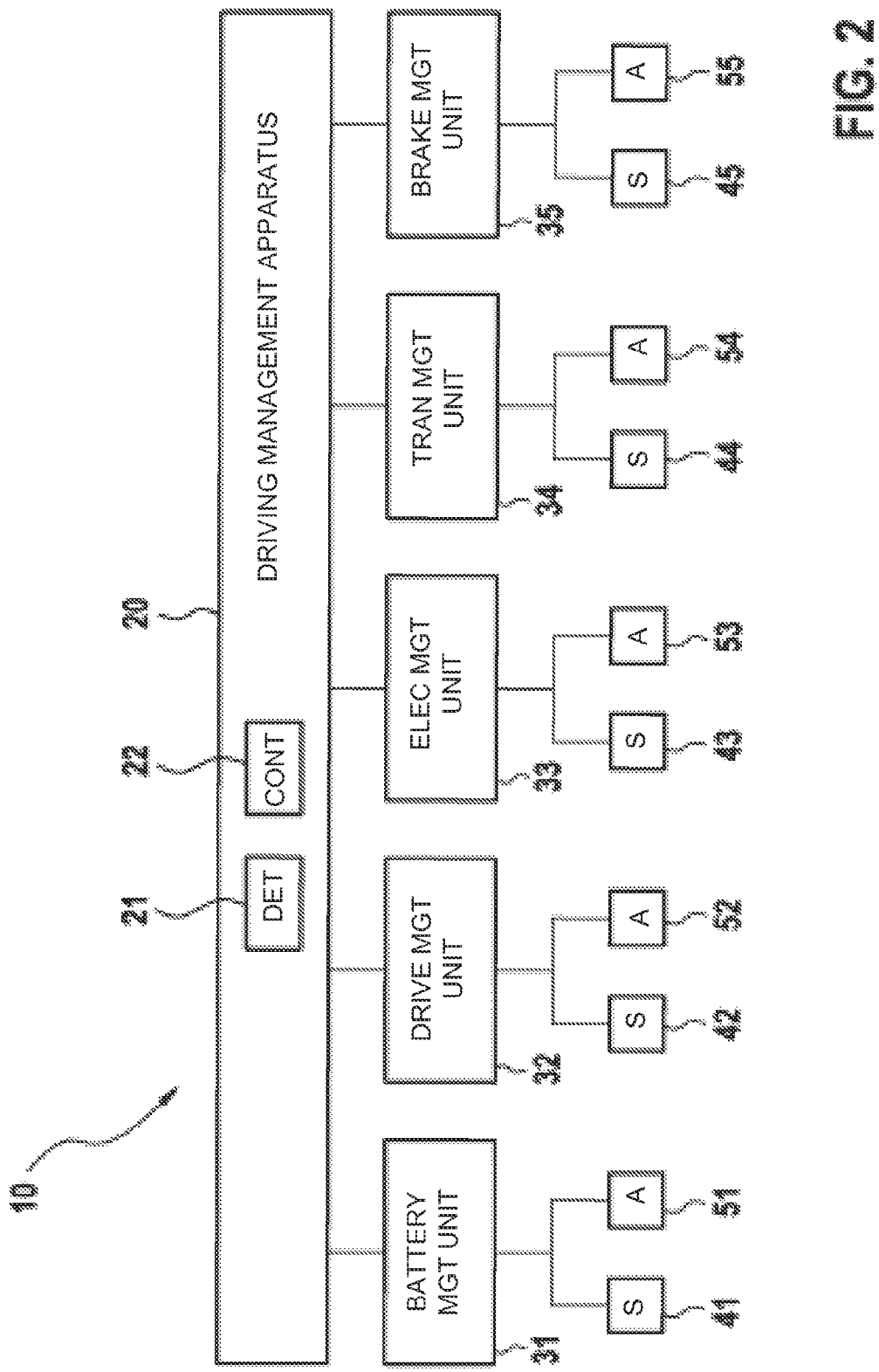
FIG. 2 shows a schematic block circuit diagram of an apparatus for power management of an electric drive device of a hybrid vehicle in accordance with a possible embodiment of the invention.

FIG. 2 shows a schematic block circuit diagram of an apparatus for power management of an electric drive device of a hybrid vehicle in accordance with a possible embodiment of the invention. An apparatus 10 comprises a driving management apparatus 20, which has a detection unit 21 and a control unit 22. Submanagement units of the apparatus 10 can be designed in accordance with their control tasks. Thus, for example, in FIG. 2, a battery management unit 31, a drive management unit 32, an electric driving management unit 33, a transmission management unit 34 and a brake management unit 35 are formed. The submanagement units 31-35 are each connected to the driving management apparatus 20 and each have dedicated sensor units 51-55 and actuator units 41-45, by means of which the respective measurement and control tasks of the submanagement unit are performed.

Figure 3:
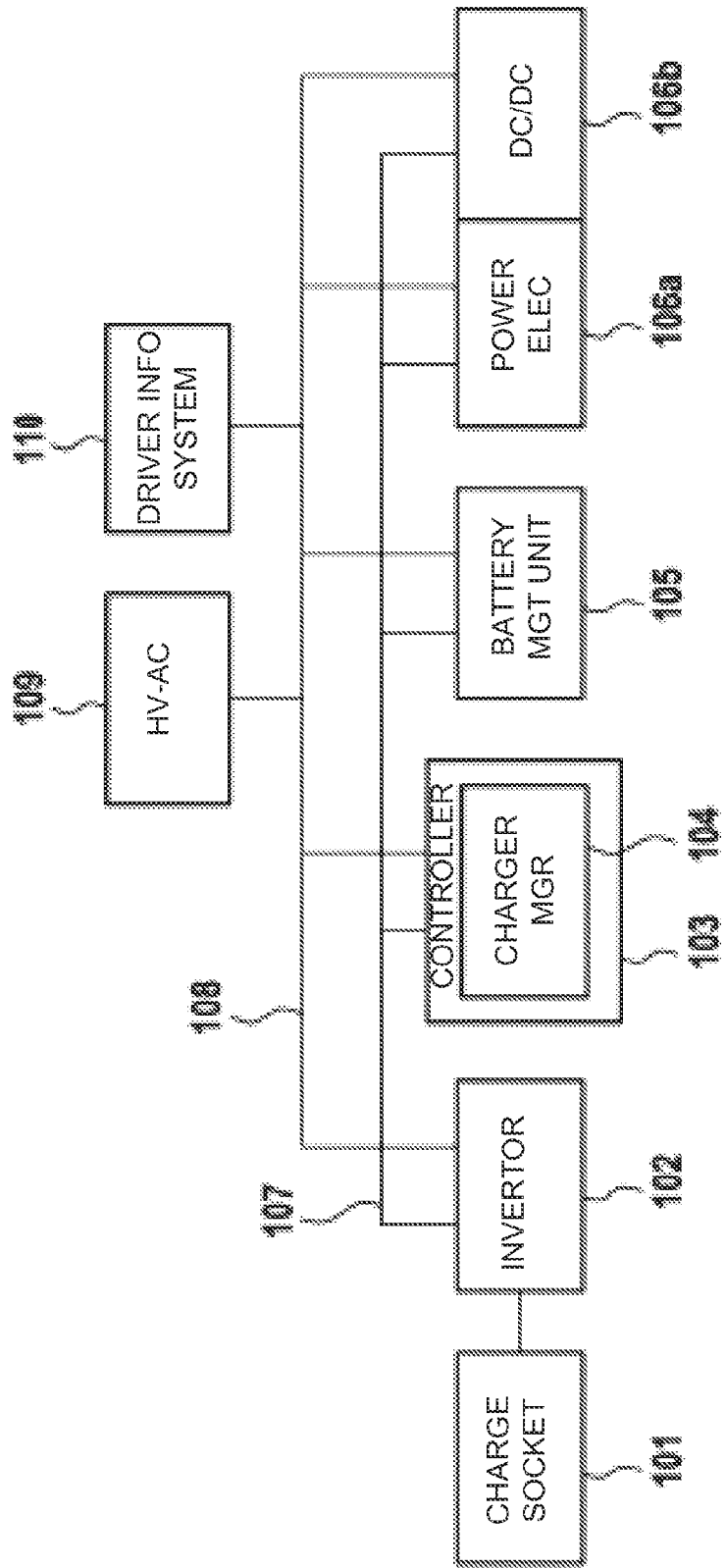
FIG. 3 shows a schematic block circuit diagram of a drive and hybrid train topology of the apparatus for power management of an electric drive device of a hybrid vehicle in accordance with a possible embodiment of the invention.

FIG. 3 shows a drive and hybrid train topology of the apparatus for power management of an electric drive device of a hybrid vehicle in accordance with a possible embodiment of the invention.

A charging socket 101 is connected to a charging inverter 102. The charging socket 101 has means for locking a charging plug and light-emitting diodes for state-of-charge indication. The charging inverter 102 is connected to an engine control device 103, which comprises a charge manager 104, via a hybrid CAN bus 107. In addition, the hybrid CAN bus 107 is connected to a battery management system 105, power electronics 106a and a DC-to-DC converter 106b.

The engine control device 103 is configured as, for example, a modern engine controller (also referred as to engine control device or engine control unit) and is a specifically developed computer which performs the control, regulation and monitoring of engine functions of the hybrid vehicle.

A drive CAN bus 108 has a connection to the charging inverter 102, the engine control device 103, the battery management system 105, the power electronics 106a and the DC-to-DC converter 106*b*. In addition, the drive CAN bus 108 is connected to a high-voltage air-conditioning apparatus 109 and a driver information system 110.

For example, the power electronics 106*a* are configured to achieve a driving performance of the hybrid vehicle which is predetermined by the electric driving management unit 33 by means of perceptions of the voltage induced at a motor-generator system and to generate a variable torque on the output shaft by targeted selection of the stator currents of the motor-generator system.

The DC-to-DC converter 106*b* is configured as an electrical circuit which converts a DC voltage supplied at the input into a DC voltage with a higher, lower or inverted voltage level in order to couple, for example, a 14-V vehicle electrical distribution system or another low-voltage electrical system of the hybrid vehicle to a high-voltage electrical system of the hybrid vehicle.

The drive CAN bus 108 and the hybrid CAN bus are configured as a CAN (Controller Area Network) bus or as another asynchronous, series bus system and/or as another fieldbus, for example.

The invention claimed is:

1. A method for power management of an electric drive device of a hybrid vehicle comprising electrical consumers and an electrical energy store, wherein the method comprises the following steps:
    detecting (S1), by a detection unit (21), a power demand for the electric drive device and an available electric battery power of the electrical energy store;
    comparing (S2), by a control unit (22), the detected power demand with the detected available electric battery power; and
    disconnecting (S3) at least one of the electrical consumers based on a criteria predetermined by the control unit (22) for one or more fixed time intervals by the control unit (22) when the comparison indicates a lower available electric battery power than the power demand; and
    wherein, after disconnection (S3) of an electrical consumer, for a fixed time interval, electrical power is made available to the electrical consumer again once the fixed time interval for a fixed switch-on time interval has elapsed.

2. The method as claimed in claim 1, wherein the power demand for the electric drive device is determined by a driving mode selected by the driver.

3. The method as claimed in claim 1, wherein the power demand for the electric drive device is determined by the control unit (22) on the basis of vehicle parameters.

4. The method as claimed in claim 1, wherein the available electric battery power of the electrical energy store is detected by electric power sensors of the detection unit (21).

5. The method as claimed in claim 1, wherein, during the comparison (S2) of the detected power demand with the detected available electric battery power, a difference is determined by the control unit (22), and the determined difference is used as one of the predetermined criteria for disconnection (S3) of a specific electrical consumer by the control unit (22).

6. The method as claimed in claim 1, wherein the electrical consumers include at least one of an interior air-conditioning unit, a battery air-conditioning unit, a DC-to-DC converter unit and an interior heating unit.

7. The method as claimed in claim 1, wherein a time interval with a duration of up to 120 seconds is used as one of the fixed time intervals.

8. The method as claimed in claim 1, wherein the disconnection (S3) is performed by a continuous reduction in the electrical power made available to the electrical consumer.

9. The method as claimed in claim 1, wherein the power demand for the electric drive device is determined by the control unit (22) on the basis of driving parameters.

10. The method as claimed in claim 1, wherein a time interval with a duration of up to 60 seconds is used as one of the fixed time intervals.

11. The method as claimed in claim 1, wherein a time interval with a duration of up to 30 seconds is used as one of the fixed time intervals.

12. An apparatus for power management of an electric drive device of a hybrid vehicle comprising electrical consumers and an electrical energy store, the apparatus comprising:
    a detection unit (21); and
    a control unit (22),
        wherein the detection unit (21) is configured to detect a power demand for the electric drive device and an available electric battery power of the electrical energy store;
        wherein the control unit (22) is configured to compare the detected power demand with the detected available electric battery power and to disconnect at least one of the electrical consumers depending on criteria predetermined by the control unit (22) for one or more fixed time intervals when the comparison result indicates a lower available electric battery power than the power demand; and
        wherein, after disconnection (S3) of an electrical consumer, for a fixed time interval, electrical power is made available to the electrical consumer again once the fixed time interval for a fixed switch-on time interval has elapsed.

13. The apparatus as claimed in claim 12, wherein the electrical consumers include at least one of an interior air-conditioning unit, a battery air-conditioning unit, a DC-to-DC converter unit and an interior heating unit.

* * * * *